Figure 1:
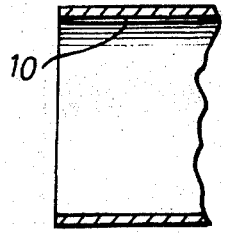

United States Patent
Batt

[15] 3,700,299
[45] Oct. 24, 1972

[54] ROLLING BEARINGS

[72] Inventor: Robert S. Batt, Barby, near Rugby, England

[73] Assignee: The Torrington Company Limited, Conventry, England

[22] Filed: Aug. 30, 1968

[21] Appl. No.: 756,449

[30] Foreign Application Priority Data

Sept. 2, 1967  Great Britain..........40,202/67
Feb. 9, 1968  Great Britain............6,554/68

[52] U.S. Cl..................................308/212, 29/148.4
[51] Int. Cl..........................F16c 13/00, F16c 33/00
[58] Field of Search ......308/217, 202, 213; 113/117; 29/148.4, 148.4 A, 148.4 C

[56] References Cited

UNITED STATES PATENTS 3,248,155  4/1966  Schaeffler...................308/212
2,038,474  4/1936  Brown...................29/148.4 A
3,314,738  4/1967  Schaeffler...................113/117
3,204,323  9/1965  Schaeffler...................308/217

FOREIGN PATENTS OR APPLICATIONS 57,418  5/1922  Sweden......................308/217
1,119,773  4/1956  France.............................217/
1,114,113  2/1962  Germany...................308/213

Primary Examiner—Edgar W. Geoghegan
Assistant Examiner—Frank Susko
Attorney—Diller, Brown, Ramik & Holt

[57] ABSTRACT

This invention relates to bearing races and bearing cages which are made of material which is initially in sheet form and which is subjected to such operations as pressing, rolling and deep drawing in order to shape it into its final configuration and in such a bearing component the invention provides one or more radial flanges which are thickened relative to the remainder of the component by folding over upon itself an end region of the component to create a multiple thickness of material constituting a flange.

4 Claims, 6 Drawing Figures

Patented Oct. 24, 1972

3,700,299

INVENTOR:
ROBERT S. BATT
BY
Mason, Porter, Diller & Brown
ATTORNEYS

ROLLING BEARINGS

This invention concerns rolling bearings.

The rolling elements of a rolling bearing are conventionally retained in an inner or an outer race member of the bearing or in a cage which additionally serves to space and guide the rolling elements during operation of the bearing. Race or cage components are often provided with radially directed end flanges or end lips for the purpose of effecting retention of the rolling elements in an axial direction such end flanges or lips also acting to strengthen the component radially.

For many of the most frequently used sizes of bearings, the race and/or cage components are formed primarily by pressing operations and the thickness of the end lips or flanges is therefore substantially the same as the thickness of the remaining tubular parts of the component. In the larger bearing sizes, it follows that as the diameter of the tubular components increases, so the radial strength of the component is reduced. This may result in the bearing component becoming out-of round either during manufacture or in subsequent service and is a problem which hitherto has been overcome only by manufacturing methods, customarily involving a machining operation, which permit the component to be made from a blank having an initial thickness equal to the required thickness of the end lips or flanges.

In a tubular bearing component according to the present invention, each end region of said component requiring to be provided with an end lip or flange is folded over to present at said end region, a multiple thickness of material constituting said end lip or flange.

Figure 2:
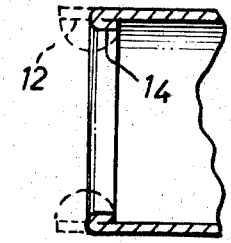
Figure 3:
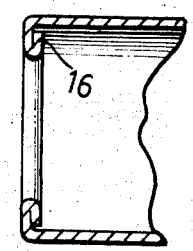
Figure 4:
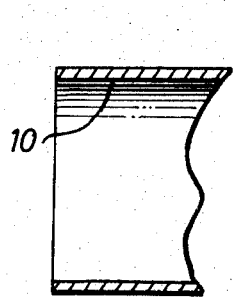
Figure 5:
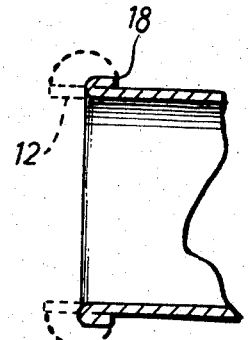
Figure 6:
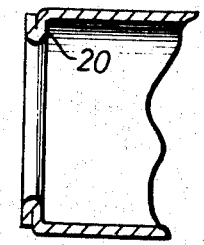

The invention will be described further, by way of example, with reference to the accompanying drawings, in which:

FIG. 1 is an axial section of a part of a cage blank prior to the formation of an end lip thereon in accordance with the invention, FIG. 2 is a similar section illustrating a first stage in the formation of the end lip, FIG. 3 shows the end lip completely formed, and FIGS. 4 to 6 inclusive are axial sections respectively similar to those of FIGS. 1 to 3 showing an alternative method of forming the end lips.

Referring firstly to FIGS. 1 to 3 of the drawings, the bearing cage therein illustrated is formed from an initial tubular blank 10 which may be cut from tubular stock or may be deep drawn from thin sheet metal. In the first step of forming the cage with a radially directed end lip, an end region 12 of the blank 10, indicated in FIG. 2 in dotted lines, is rolled axially inwardly of the blank to lie flat against the internal cylindrical surface of the blank as shown at 14. There is this produced at the end of the blank, a reinforced region having double the thickness of the remainder of the blank and this double thickness region is in turn rolled radially inwardly of the blank to define a radially inwardly directed and double thickness end lip 16. This double thickness end lip 16 possesses substantial radial strength relative to the remaining, single thickness parts of the blank 10 and thus in the finished cage serves to maintain the cage more adequately in a truly round condition than would otherwise be the case.

The alternative method of forming an end lip shown in FIGS. 4 to 6 again starts from a blank 10, the end region 12 of which in this instance, as evident from FIG. 5, is rolled axially outwardly of the blank to lie against the external cylindrical surface of the blank as illustrated at 18. The double thickness region resulting from this rolling operation is then rolled radially inwardly of the blank to define a radially inwardly directed and double thickness end lip 20.

I claim:

1. In a method of working an elongated tubular blank to form a bearing component of tubular configuration having end regions and an intermediate rolling element engaging surface, at least one of said end regions being bent radially relative to the remainder of said component to define a radially directed end lip, the improvement wherein said end region is first subjected to a rolling operation to fold it upon itself and thereby to create a multiple thickness of material constituting said end lip.

2. A method of forming a bearing component as set forth in claim 1 wherein said end region is first reversely folded axially inwardly of said component to lie against the internal tubular surface thereof and forms a double thickness folded region, and then radially inwardly folded to direct the double thickness folded region radially inwardly of said component to constitute said end lip.

3. A method of forming a bearing component as set forth in claim 1, wherein said end region is first reversely folded axially outwardly to lie against the external tubular surface of said component and form a double thickness folded region, and then radially inwardly folded to direct the double thickness folded region radially inwardly of said component to constitute said end lip.

4. A bearing component of tubular configuration formed in accordance with the method of claim 1 to include end regions and an intermediate rolling element engaging surface with at least one of said end regions being bent radially inwardly relative to the remainder of said bearing component and defining a radially directed end lip which is directly reversely bent upon itself to be of a multiple thickness, said directly reversely bent multiple thickness lip being formed in accordance with the method of claim 1 by first subjecting said at least one end region to a rolling operation to fold it upon itself to create said multiple thickness of material.

* * * * *